United States Patent
Stahl et al.

(10) Patent No.: US 12,010,155 B2
(45) Date of Patent: Jun. 11, 2024

(54) OPERATING SYSTEM LEVEL MANAGEMENT OF GROUP COMMUNICATION SESSIONS

(71) Applicant: Apple Inc., Cupertino, CA (US)

(72) Inventors: Geoffrey Stahl, San Jose, CA (US);
Jeffrey S. Norris, Saratoga, CA (US);
Timothy R. Oriol, San Jose, CA (US);
Joel N. Kerr, San Jose, CA (US);
Srinivas Vedula, Fremont, CA (US);
Bruno Sommer, Sunnyvale, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 17/224,077

(22) Filed: Apr. 6, 2021

(65) Prior Publication Data
US 2022/0094724 A1    Mar. 24, 2022

Related U.S. Application Data

(60) Provisional application No. 63/083,010, filed on Sep. 24, 2020.

(51) Int. Cl.
*G06F 15/16* (2006.01)
*H04L 65/401* (2022.01)
*H04L 65/403* (2022.01)

(52) U.S. Cl.
CPC .......... *H04L 65/401* (2022.05); *H04L 65/403* (2013.01)

(58) Field of Classification Search
CPC ............................ H04L 65/4007; H04L 65/403
See application file for complete search history.

(56) References Cited

U.S. PATENT DOCUMENTS

| | | | |
|---|---|---|---|
| 2008/0316687 A1 | 12/2008 | Backer | |
| 2008/0318687 A1* | 12/2008 | Backer | A63F 13/49 463/43 |
| 2009/0178062 A1* | 7/2009 | Westen | H04N 7/147 719/328 |

(Continued)

FOREIGN PATENT DOCUMENTS

| | | |
|---|---|---|
| EP | 3498351 | 6/2019 |
| WO | WO 2014/084711 | 6/2014 |
| WO | WO 2019/067476 | 4/2019 |

OTHER PUBLICATIONS

International Search Report and Written Opinion from PCT/US2021/043055, dated Oct. 7, 2021, 15 pages.

*Primary Examiner* — Normin Abedin
(74) *Attorney, Agent, or Firm* — BAKERHOSTETLER

(57) ABSTRACT

A device for providing operating system managed group communication sessions may include a memory and at least one processor. The at least one processor may be configured to receive, by an operating system level process executing on a device and from an application process executing on a device, a request to initiate a group session between a user associated with the device and another user. The at least one processor may be further configured to identify, by the operating system level process, another device associated with the other user. The at least one processor may be further configured to initiate, by the operating system level process, the group session with the user via the other device. The at least one processor may be further configured to manage, by the operating system level process, the group session.

24 Claims, 7 Drawing Sheets

(56) References Cited

U.S. PATENT DOCUMENTS

| | | |
|---|---|---|
| 2016/0182465 A1 | 6/2016 | Lam et al. |
| 2020/0019295 A1* | 1/2020 | Spivack ................ G06F 3/1454 |
| 2020/0201521 A1* | 6/2020 | Faulkner ............... G06F 3/0485 |

* cited by examiner

OPERATING SYSTEM LEVEL MANAGEMENT OF GROUP COMMUNICATION SESSIONS

CROSS REFERENCE TO RELATED APPLICATIONS

This application claims the benefit of priority to U.S. Provisional Patent Application No. 63/083,010, filed on Sep. 24, 2020, the disclosure of which is hereby incorporated herein in its entirety.

TECHNICAL FIELD

The present description relates generally to communications management, including operating system level management of group communication sessions.

BACKGROUND

Augmented reality technology aims to bridge a gap between virtual environments and a physical environment by providing an enhanced physical environment that is augmented with electronic information. As a result, the electronic information appears to be part of the physical environment as perceived by a user while the user views the physical environment via the augmented reality technology.

BRIEF DESCRIPTION OF THE DRAWINGS

Certain features of the subject technology are set forth in the appended claims. However, for purpose of explanation, several embodiments of the subject technology are set forth in the following figures.

DETAILED DESCRIPTION

Figure 1:
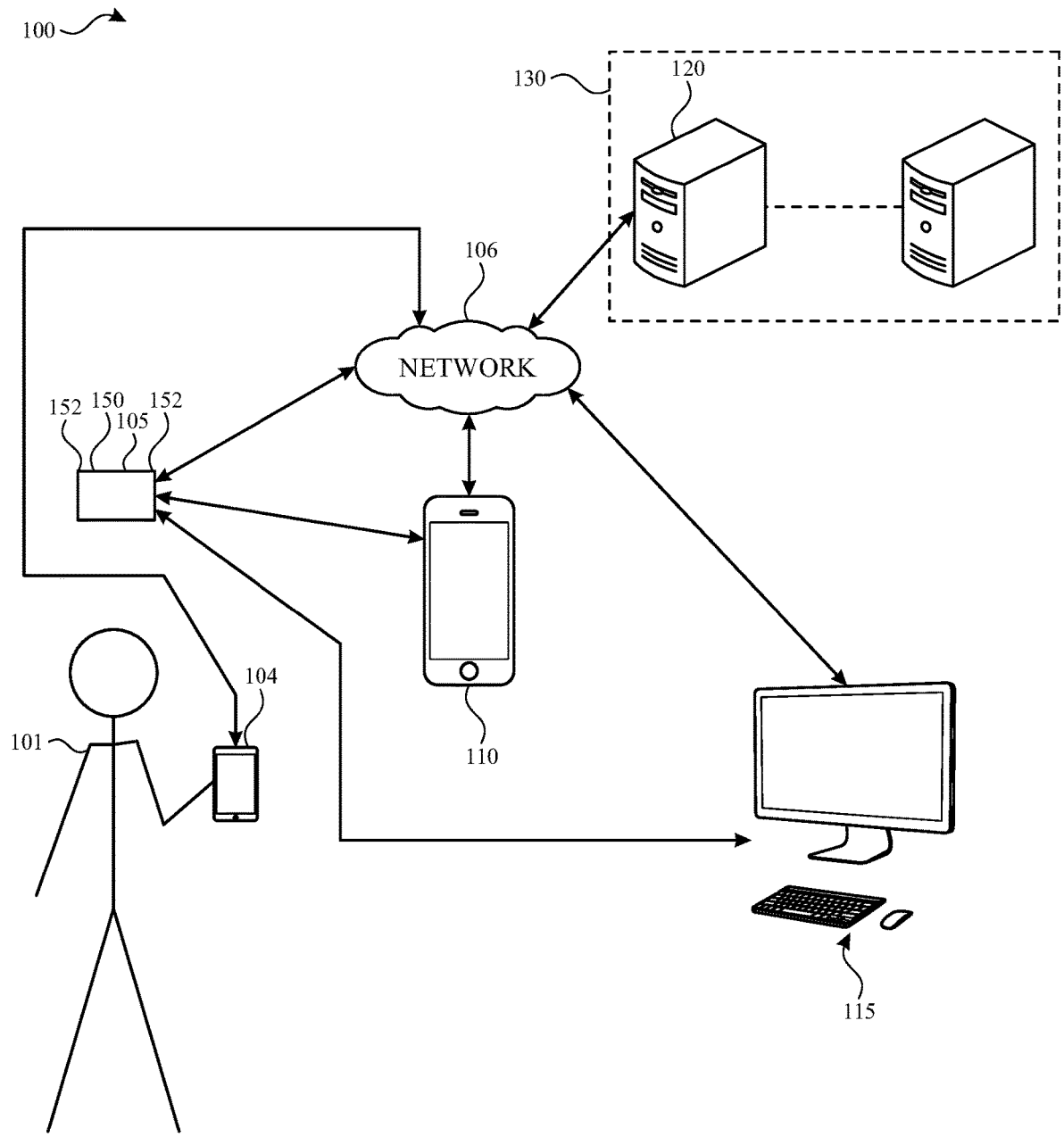
FIG. 1 illustrates an example system architecture including various electronic devices that may implement the subject system in accordance with one or more implementations.

The detailed description set forth below is intended as a description of various configurations of the subject technology and is not intended to represent the only configurations in which the subject technology can be practiced. The appended drawings are incorporated herein and constitute a part of the detailed description. The detailed description includes specific details for the purpose of providing a thorough understanding of the subject technology. However, the subject technology is not limited to the specific details set forth herein and can be practiced using one or more other implementations. In one or more implementations, structures and components are shown in block diagram form in order to avoid obscuring the concepts of the subject technology.

A physical environment refers to a physical world that people can sense and/or interact with without aid of electronic devices. The physical environment may include physical features such as a physical surface or a physical object. For example, the physical environment corresponds to a physical park that includes physical trees, physical buildings, and physical people. People can directly sense and/or interact with the physical environment such as through sight, touch, hearing, taste, and smell. In contrast, an extended reality (XR) environment refers to a wholly or partially simulated environment that people sense and/or interact with via an electronic device. For example, the XR environment may include augmented reality (AR) content, mixed reality (MR) content, virtual reality (VR) content, and/or the like. With an XR system, a subset of a person's physical motions, or representations thereof, are tracked, and, in response, one or more characteristics of one or more virtual objects simulated in the XR environment are adjusted in a manner that comports with at least one law of physics. As one example, the XR system may detect head movement and, in response, adjust graphical content and an acoustic field presented to the person in a manner similar to how such views and sounds would change in a physical environment. As another example, the XR system may detect movement of the electronic device presenting the XR environment (e.g., a mobile phone, a tablet, a laptop, or the like) and, in response, adjust graphical content and an acoustic field presented to the person in a manner similar to how such views and sounds would change in a physical environment. In some situations (e.g., for accessibility reasons), the XR system may adjust characteristic(s) of graphical content in the XR environment in response to representations of physical motions (e.g., vocal commands).

There are many different types of electronic systems that enable a person to sense and/or interact with various XR environments. Examples include head mountable systems, projection-based systems, heads-up displays (HUDs), vehicle windshields having integrated display capability, windows having integrated display capability, displays formed as lenses designed to be placed on a person's eyes (e.g., similar to contact lenses), headphones/earphones, speaker arrays, input systems (e.g., wearable or handheld controllers with or without haptic feedback), smartphones, tablets, and desktop/laptop computers. A head mountable system may have one or more speaker(s) and an integrated opaque display. Alternatively, a head mountable system may be configured to accept an external opaque display (e.g., a smartphone). The head mountable system may incorporate one or more imaging sensors to capture images or video of the physical environment, and/or one or more microphones to capture audio of the physical environment. Rather than an opaque display, a head mountable system may have a transparent or translucent display. The transparent or translucent display may have a medium through which light representative of images is directed to a person's eyes. The display may utilize digital light projection, OLEDs, LEDs, uLEDs, liquid crystal on silicon, laser scanning light source, or any combination of these technologies. The medium may be an optical waveguide, a hologram medium, an optical combiner, an optical reflector, or any combination thereof. In some implementations, the transparent or translucent display may be configured to become opaque selectively. Projection-based systems may employ retinal projection technology that projects graphical images onto a person's retina. Projection systems also may be configured to project virtual objects into the physical environment, for example, as a hologram or on a physical surface.

Implementations of the subject technology described herein provide for operating system level management of management of group communication sessions between user devices. A group communication session (also referred to herein as a group session) allows multiple users to be present (e.g., concurrently present) in a common XR environment via their respective devices. The users may be physically co-located in the same physical location, and/or one or more of the users may be located in physically remote locations. By providing for operating system level management of group communication sessions, the subject system allows individual applications to access operating system level group communication functionality by making application programming interface (API) calls to an operating system level group session framework, rather than each application having to individually develop its own group session functionality. Thus, the subject system allows any individual application to provide users with access to a group session for accessing/interacting with content of the application, without the application having to develop its own group session functionality/framework and irrespective of whether the application was designed for multi-user access.

By moving group session management to the operating system level, the subject system can also provide tighter controls around user authentication, digital rights management, and user access rights/permissions during group communication sessions. For example, an operating system level framework can authenticate individual users participating in a group session, as well as the users' avatars used for the group session, such as to confirm that the appearance of the avatars generally conforms with the physical appearance of the user. In this manner, a user participating in a group session with another user can have confidence that the other user is who they purport to be (via the user authentication), and that the other user is the person that the user intends to be participating in the group session with (via the avatar authentication).

The operating system level group session framework can also enforce DRM controls around content being viewed and/or shared in a group session, such as by preventing copying/redistributing of the content, controlling a number of concurrent users accessing the content, and the like. In this manner, content providers can be assured that their content rights will be maintained when content is shared amongst users in a group session. Similarly, the operating system level group session framework can provide a user, e.g., the session initiating user, with discrete controls over user access rights/permissions during a group session. In this manner, the operating system level group session framework allows a session initiating user to decide which other users can interact with, modify, remove, and/or view any particular application content during the session, as well as which other users can record and/or later annotate any portion of the group session.

FIG. 1 illustrates an example system architecture 100 including various electronic devices that may implement the subject system in accordance with one or more implementations. Not all of the depicted components may be used in all implementations, however, and one or more implementations may include additional or different components than those shown in the figure. Variations in the arrangement and type of the components may be made without departing from the spirit or scope of the claims as set forth herein. Additional components, different components, or fewer components may be provided.

The system architecture 100 includes an electronic device 105, a handheld electronic device 104, an electronic device 110, an electronic device 115, and a server 120. For explanatory purposes, the system architecture 100 is illustrated in FIG. 1 as including the electronic device 105, the handheld electronic device 104, the electronic device 110, the electronic device 115, and the server 120; however, the system architecture 100 may include any number of electronic devices, and any number of servers or a data center including multiple servers.

The electronic device 105 may be implemented, for example, as a tablet device, a smartphone, or as a head mountable portable system (e.g., worn by a user 101). The electronic device 105 includes a display system capable of presenting a visualization of an extended reality environment to the user. The electronic device 105 may be powered with a battery and/or another power supply. In an example, the display system of the electronic device 105 provides a stereoscopic presentation of the extended reality environment, enabling a three-dimensional visual display of a rendering of a particular scene, to the user. In one or more implementations, instead of, or in addition to, utilizing the electronic device 105 to access an extended reality environment, the user may use a handheld electronic device 104, such as a tablet, watch, mobile device, and the like.

The electronic device 105 may include one or more cameras such as camera(s) 150 (e.g., visible light cameras, infrared cameras, etc.) Further, the electronic device 105 may include various sensors 152 including, but not limited to, cameras, image sensors, touch sensors, microphones, inertial measurement units (IMU), heart rate sensors, temperature sensors, depth sensors (e.g., Lidar sensors, radar sensors, sonar sensors, time-of-flight sensors, etc.), GPS sensors, Wi-Fi sensors, near-field communications sensors, radio frequency sensors, etc. Moreover, the electronic device 105 may include hardware elements that can receive user input such as hardware buttons or switches. User input detected by such sensors and/or hardware elements correspond to, for example, various input modalities for initiating a group communications session (group session) from within an application. For example, such input modalities may include, but are not limited to, facial tracking, eye tracking (e.g., gaze direction), hand tracking, gesture tracking, biometric readings (e.g., heart rate, pulse, pupil dilation, breath, temperature, electroencephalogram, olfactory), recognizing speech or audio (e.g., particular hotwords), and activating buttons or switches, etc.

In one or more implementations, the electronic device 105 may be communicatively coupled to a base device such as the electronic device 110 and/or the electronic device 115. Such a base device may, in general, include more computing resources and/or available power in comparison with the electronic device 105. In an example, the electronic device 105 may operate in various modes. For instance, the electronic device 105 can operate in a standalone mode independent of any base device. When the electronic device 105 operates in the standalone mode, the number of input modalities may be constrained by power and/or processing limitations of the electronic device 105 such as available battery power of the device. In response to power limitations, the electronic device 105 may deactivate certain sensors within the device itself to preserve battery power and/or to free processing resources.

The electronic device 105 may also operate in a wireless tethered mode (e.g., connected via a wireless connection with a base device), working in conjunction with a given base device. The electronic device 105 may also work in a connected mode where the electronic device 105 is physically connected to a base device (e.g., via a cable or some other physical connector) and may utilize power resources provided by the base device (e.g., where the base device is charging the electronic device 105 while physically connected).

When the electronic device 105 operates in the wireless tethered mode or the connected mode, a least a portion of processing user inputs and/or rendering the extended reality environment may be offloaded to the base device thereby reducing processing burdens on the electronic device 105. For instance, in an implementation, the electronic device 105 works in conjunction with the electronic device 110 or the electronic device 115 to generate an extended reality environment including physical and/or virtual objects that enables different forms of interaction (e.g., visual, auditory, and/or physical or tactile interaction) between the user and the generated extended reality environment in a real-time manner. In an example, the electronic device 105 provides a rendering of a scene corresponding to the extended reality environment that can be perceived by the user and interacted with in a real-time manner, such as a host environment for a group session with another user. Additionally, as part of presenting the rendered scene, the electronic device 105 may provide sound, and/or haptic or tactile feedback to the user. The content of a given rendered scene may be dependent on available processing capability, network availability and capacity, available battery power, and current system workload.

The network 106 may communicatively (directly or indirectly) couple, for example, the electronic device 105, the electronic device 110, and/or the electronic device 115 with each other device and/or the server 120. In one or more implementations, the network 106 may be an interconnected network of devices that may include, or may be communicatively coupled to, the Internet.

The electronic device 110 may include a touchscreen and may be, for example, a smartphone that includes a touchscreen, a portable computing device such as a laptop computer that includes a touchscreen, a companion device that includes a touchscreen (e.g., a digital camera, headphones), a tablet device that includes a touchscreen, a wearable device that includes a touchscreen such as a watch, a band, and the like, any other appropriate device that includes, for example, a touchscreen, or any electronic device with a touchpad. In one or more implementations, the electronic device 110 may not include a touchscreen but may support touchscreen-like gestures, such as in an extended reality environment. In one or more implementations, the electronic device 110 may include a touchpad. In FIG. 1, by way of example, the electronic device 110 is depicted as a mobile smartphone device with a touchscreen. In one or more implementations, the electronic device 110, the handheld electronic device 104, and/or the electronic device 105 may be, and/or may include all or part of, the electronic device discussed below with respect to the electronic system discussed below with respect to FIG. 7. In one or more implementations, the electronic device 110 may be another device such as an Internet Protocol (IP) camera, a tablet, or a companion device such as an electronic stylus, etc.

The electronic device 115 may be, for example, desktop computer, a portable computing device such as a laptop computer, a smartphone, a companion device (e.g., a digital camera, headphones), a tablet device, a wearable device such as a watch, a band, and the like. In FIG. 1, by way of example, the electronic device 115 is depicted as a desktop computer. The electronic device 115 may be, and/or may include all or part of, the electronic system discussed below with respect to FIG. 7.

The server 120 may form all or part of a network of computers or a group of servers 130, such as in a cloud computing or data center implementation. For example, the server 120 stores data and software, and includes specific hardware (e.g., processors, graphics processors and other specialized or custom processors) for rendering and generating content such as graphics, images, video, audio and multi-media files for extended reality environments. In an implementation, the server 120 may function as a cloud storage server that stores any of the aforementioned extended reality content generated by the above-discussed devices and/or the server 120.

Figure 2:
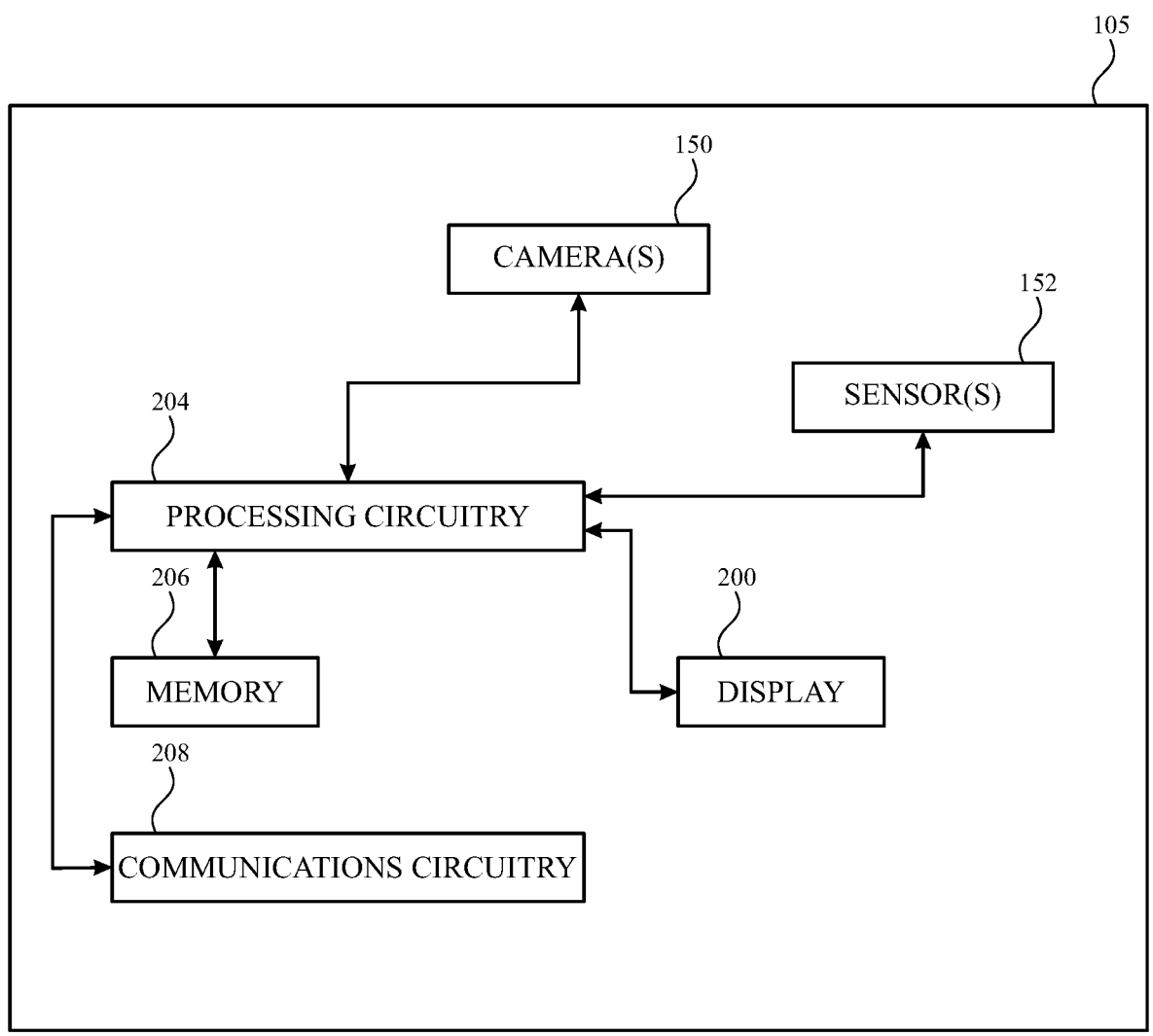
FIG. 2 illustrates a block diagram of example features of an electronic device, in accordance with one or more implementations.

FIG. 2 illustrates a block diagram of various components that may be included in electronic device 105, in accordance with aspects of the disclosure. As shown in FIG. 2, electronic device 105 may include one or more cameras such as camera(s) 150 that capture images and/or video of the physical environment around the electronic device, one or more sensors 152 that obtain environment information (e.g., depth information) associated with the physical environment around the electronic device 105. Sensors 152 may include depth sensors (e.g., time-of-flight sensors, infrared sensors, radar, sonar, lidar, etc.), one or more microphones, and/or other types of sensors for sensing the physical environment. Electronic device 105 also includes communications circuitry 208 for communication with electronic device 110, electronic device 115, servers 120, and/or other devices and/or systems in some implementations. Communications circuitry 208 may include radio frequency (RF) communications circuitry for detecting radio frequency identification (RFID) tags, Bluetooth Low Energy (BLE) communications circuitry, other near-field communications (NFC) circuitry, WiFi communications circuitry, cellular communications circuitry, and/or other wired and/or wireless communications circuitry.

As shown, electronic device 105 includes processing circuitry 204 (e.g., one or more processors and/or integrated circuits) and memory 206. Memory 206 may store (e.g., temporarily or permanently) content generated by and/or otherwise obtained by electronic device 105. In some operational scenarios, memory 206 may temporarily store images of a physical environment captured by camera(s) 150, depth information corresponding to the images generated, for example, using a depth sensor of sensors 152, meshes corresponding to the physical environment, virtual objects such as virtual objects generated by processing circuitry 204 to include virtual content, and/or virtual depth information for the virtual objects. Memory 206 may store (e.g., temporarily or permanently) intermediate images and/or information generated by processing circuitry 204 for combining the image(s) of the physical environment and the virtual objects and/or virtual image(s) to form, e.g., composite images for display by display 200, such as by compositing one or more virtual objects onto a pass-through video stream obtained from one or more of the cameras 150.

Memory 206 may store instructions or code for execution by processing circuitry 204, such as, for example operating system code corresponding to an operating system installed on the electronic device 105, and application code corresponding to one or more applications installed on the electronic device 105. The operating system code, when executed, may correspond to one or more operating system level processes, such as processes that support management of group sessions. The operating system level processes may have administrative privileges (e.g., unconstrained access) to logical resources, e.g., file system resources, and/or as physical resources, e.g., hardware resources such as camera(s) 150, sensors 152, and the like, whereas the application code, when executed, may correspond to one or more application processes that have constrained access, or no access, to one or more of the logical and/or physical resources.

However, the application code may have access, such as through an application programming interface (API), to one or more function calls to the operating system level code, such as for group session management functionality. For example, the application code may have access to function calls for requesting that a group communication session (group session) be initiated, requesting that a group communication session be terminated, requesting that a user be added to, or removed from, an existing group communication session, and the like. In this manner, the one or more installed applications can have access to group session functionality through the operating system level processes without having to individually develop a group session framework. An example process of an application initiating a group session via an operating system level framework is discussed further below with respect to FIG. 3.

Figure 3:
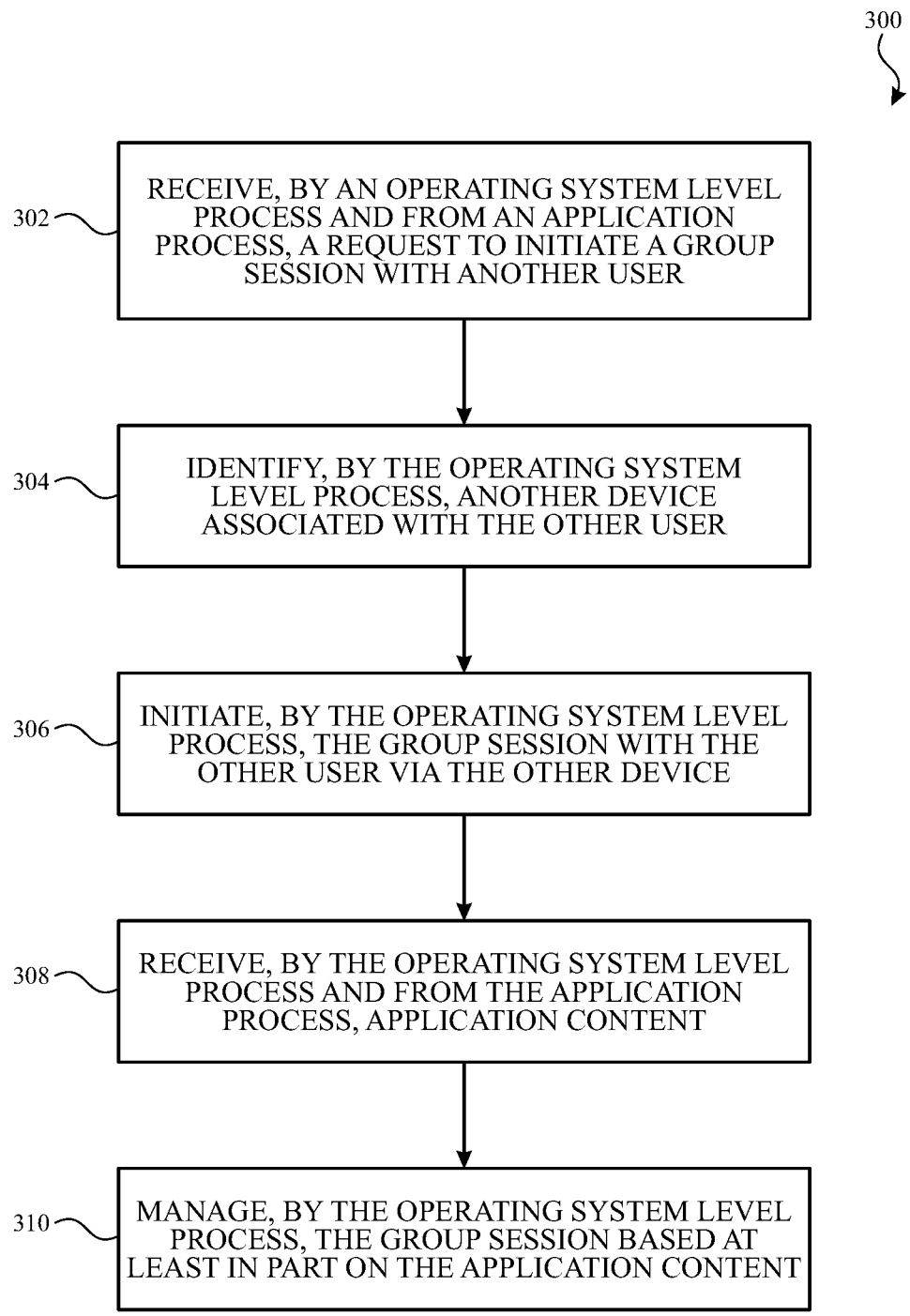
FIG. 3 illustrates a flow diagram of an example process of operating system level management of group communication sessions in accordance with one or more implementations.

FIG. 3 illustrates a flow diagram of an example process 300 of operating system level group session management in accordance with one or more implementations. For explanatory purposes, the process 300 is primarily described herein with reference to the electronic device 105 of FIGS. 1 and 2. However, the process 300 is not limited to the electronic device 105 of FIGS. 1 and 2, and one or more blocks (or operations) of the process 300 may be performed by one or more other components of other suitable devices, including the electronic device 110, the electronic device 115, and/or the servers 120. Further for explanatory purposes, some of the blocks of the process 300 are described herein as occurring in serial, or linearly. However, multiple blocks of the process 300 may occur in parallel. In addition, the blocks of the process 300 need not be performed in the order shown and/or one or more blocks of the process 300 need not be performed and/or can be replaced by other operations.

The process 300 may be initiated when an operating system level process executing on an electronic device 105 receives, from an application process executing on the electronic device 105, a request to initiate a group session with another user (302). In one or more implementations, the electronic device 105 may be an electronic device that supports displaying XR content in an XR environment, such as a smartphone, a tablet device, or a head mountable system worn by the user. For example, application developers developing applications for such an electronic device 105 may have the option to opt-in for access to operating system level management of group sessions. If an application developer opts-in for a particular application, users of the application may have access to one or more group session management functions from within the application, such as initiating a group session, terminating a group session, adding a user to a group session and the like.

For example, a user of the application may be able to select a user interface element to initiate a group session with one or more other users (e.g., contacts of the user), the user may be able to use voice commands to initiate a group session, or the user may be able to use generally any available input modalities to imitate a group session from within the application. The application process may receive the request from the user input, and may then communicate the request to an operating system level group session management process. The request communicated to the operating system level process may include, for example, one or more user identifiers corresponding to the one or more users with whom the group session is being initiated.

The operating system level process may identify one or more other electronic devices, such as the electronic device 104, that are associated with the received user identifiers (304). For example, the operating system level process may transmit a request to a server, such as the server 120, to obtain one or more device identifiers corresponding to the one or more received user identifiers.

The operating system level process may then initiate the group session with the other user via the other electronic device 104 of the other user (306). For example, the operating system level process may authenticate the user and/or the other user, as well as the users' avatars (as discussed further below), and if the other electronic device 104 supports displaying XR content in an XR environment, the operating system level process may communicate with a counterpart operating system level process of the electronic device 104 to initiate the group session within a host environment, e.g., as specified by the initiating user of the electronic device 105 (as discussed further below).

In one or more implementations, the operating system level process may authenticate the user of the electronic device 105, such as based on biometric information (iris scan, facial scan, fingerprint scan, biorhythm scan, and the like), as well as authenticating the avatar being used by the user for the group session. For example, the user initiating the group session may be able to select an option (e.g., via the application process) that requires that users use authentic avatars for the group session (e.g., an avatar that has an appearance that conforms to the appearance of the corresponding user as opposed to non-conforming avatars, e.g. of a clown). Such an option may be desirable, for example, in a business setting or otherwise when users want to be able to visually verify the identity of the user they are interacting with. In this instance, the operating system level process may obtain images from one or more cameras 150, depth information, facial information and/or other information that can be used to authenticate that the visual appearance of the avatar being used by the user of the electronic device 105 generally conforms to the physical appearance of the user of the electronic device 105. For example, the operating system level process may compare avatar and user facial feature positions, sizes, etc., hair style/length/color, skin tone, eye color, or generally any attributes and/or characteristics that may be used to visually authenticate that the appearance of the user's avatar conforms to the user's physical appearance.

In one or more implementations, the operating system level process may automatically generate an avatar for the user when an authentic avatar is required. That is, instead of comparing the user's physical attributes to the visual attributes of an avatar created by the user, the operating system level process may automatically scan the user's facial attributes and/or physical appearance and may generate an avatar that visually conforms to the physical appearance of the user.

The operating system level process of the electronic device 105 may then exchange, with the counterpart operating system level process of the electronic device 104, signed certificates (e.g., using hardware bound private keys) authenticating that the users of the electronic devices 104, 105 correspond to the user identifiers selected for the group session, and authenticating that the appearance of the avatars selected by the users for the group session generally conform to the physical appearance of the users.

In one or more implementations, the authentication of the users of the electronic devices 104, 105 may be performed periodically throughout the group session, such as to confirm that the same user is still participating in the group session with the respective electronic devices 104, 105. Alternatively, or in addition, if one or more of the electronic devices 104, 105 is a device, such as smartphone, a tablet device, or a head mountable system, which includes sensors that can detect when the user has put down or removed the electronic device, the user authentication may be maintained until the release (e.g., by the user's hands) or removal of the electronic device has been detected.

After authenticating the users and/or the users' avatars, the operating system level process may determine the appropriate host environment for initiating the group session within. The host environment may be based on, for example, the physical environment of the user of the electronic device 105, the physical environment of the other user of the electronic device 104, a hybrid of the physical environments, or a virtual environment (e.g., a virtual environment and/or a reproduction of another physical environment). For example, the user of the electronic device 105 from which the group session is being initiated may be authorized to select the appropriate environment for hosting the group session.

In one or more implementations, a hybrid of the physical environments of each user may include a portion of each user's physical environment with a blending/merging of the environments/geometries in the middle. In one or more implementations, a host environment (e.g., a virtual environment, a reproduction of a physical environment, and the like) can be created and persisted, or saved, such that users can subsequently have additional group sessions in the same host environment.

In the instance that the group session is being hosted in an environment based on the physical environment of the user of the electronic device 105, the operating system level process of the electronic device 105 may coordinate displaying a pass-through video stream corresponding to the physical environment, e.g. from one or more of the cameras 150, in conjunction with a computer generated avatar corresponding to the other user and/or application content.

The operating system level process of the electronic device 105 may also provide, to a counterpart operating system level process executing on the electronic device 104, information for generating a reconstruction of the physical environment of the user of the electronic device 105. The information may include, for example, previously generated and stored, meshes and textures for objects in the physical environment, the pass-through video stream (and any corresponding depth information) for the portion of the physical environment being viewed by the user of the electronic device 105, and previously stored video and/or images/textures/meshes with respect to the portion of the physical environment that is not being viewed by the user of the electronic device 105 (e.g., behind the user which would be in the field of view of the user of the electronic device 104).

In one or more implementations, if the other electronic device 104 does not support displaying XR content in an XR environment (e.g., if the electronic device 105 is an XR device and the electronic device 104 is a mobile device or a tablet device that has not been updated to include XR functionality), the operating system level process may initiate the group session with an existing communication application on the electronic device 104, such as an existing videoconferencing application. For example, the operating system level process may convert any XR content into a video stream and may provide the video stream to the electronic device 104. Similarly, the operating system level process may convert a received video stream (e.g., and any received corresponding depth information) into XR content that can be displayed to the user of the electronic device 105, and/or the operating system level process may display the received video stream in its original two-dimensional form.

After establishing the host environment for the group session, the operating system level process may receive application content from the application process (308). For example, the application process may communicate application content, such as XR content or generally any content, and/or a declarative description of the application content, to the operating system level process via inter-process communication (IPC).

The operating system level process may then manage the group session based at least in part on the received application content (310). For example, the operating system level process may determine an appropriate manner for displaying the application content in the host environment of the group session (such as based on the host environment, the number of users in the group session, other application content being displayed in the group session, and the like). In this manner, the developer of the application corresponding to the application process does not need to develop any separate framework for supporting group sessions, for supporting multiple concurrent users, and/or for supporting the appropriate physics, geometries, shading, etc. for displaying the application content within an XR environment. For example, the operating system level process may coordinate displaying at least a portion of the application content in conjunction with displaying at least a portion of the pass-through video feed, and may handle the corresponding display attributes for the application content, e.g., physics, geometries, shading, and the like.

In one or more implementations, since the application process provides the application content to the operating system level processes for display, the application process can be insulated from the host environment of the group session, as well as the user interactions/communications within the group session (e.g., aside from interactions directly with the application content). In this manner, the operating system level process can prevent the application process for accessing the pass-through video stream and/or information for reconstructing the user's physical environment, as well as the interactions between the users during the group session, which preserves the privacy of each of the users in the group session.

The operating system level process may further coordinate and/or synchronize with a counterpart operating system level process executing on the other electronic device 104. For example, the operating system level processes may coordinate both the display of content, such as application content as well as the aforementioned host environment, in addition to coordinating/synchronizing user interactions with the displayed content. For example, the operating system level processes may manage conflict resolution with respect to user interactions with the application content, such as by prioritizing the interactions by the user who initiated the group session.

In one or more implementations, if the application corresponding to the application content is not installed on the electronic device 104 of the other user, the operating system level process of the electronic device 105 may coordinate with the counterpart operating system level process of the electronic device 104 to cause the electronic device 104 to download and install at least a portion of the application (e.g., a portion of the application corresponding to the application content and/or a viewer/lightweight version of the application).

In one or more implementations, the group session may begin while the other electronic device 104 is in the process of downloading and installing the application. In this instance, the operating system level process of the electronic device 105 may serialize the application content (e.g., into a non-interactive version of the application content), into a format (e.g., video stream or generic/standard XR format) that can be displayed by the counterpart operating system level process of the other electronic device 104 without having the application installed. In one or more implementations, if the other electronic device 104 cannot download and/or install the application (e.g., because the other user does not have a license to the application, because the other electronic device 104 does not have space to install the other application, or for any reason), the serialized version of the application content may be utilized for the entire group session.

After the other electronic device 104 has downloaded and installed the application, the counterpart operating system level process on the other electronic device 104 may notify the operating system level process on the electronic device 105 that the application has been installed. The operating system level process on the electronic device 105 may then seamlessly transition from providing the serialized version of the application content (e.g., a non-interactive version and/or two-dimensional version) to providing the application content (e.g., an interactive and/or three-dimensional version). In one or more implementations, one or more visual cues may be provided to indicate to the user and/or the other user that the application content has transitioned to an interactive version, such as by altering the color, hue, brightness, or generally any visible characteristic of the application content.

In one or more implementations, the application content may correspond to and/or identify digital rights management (DRM) protected content. For example, users in a group session may wish to watch a particular movie or other video content together in the group session. In this instance, the operating system level process of the electronic device 105 may provide the counterpart operating system level process of the electronic device 104 with a network identifier from retrieving the DRM content, such as from a content server. The operating system level process of the electronic device 105 may also facilitate providing the counterpart operating system level process of the electronic device 104 with an appropriate key, such as a content key, for accessing (e.g., decrypting) the content. The operating system level process of the electronic device 105 may then synchronize playback of the content (individually by each the electronic devices 104, 105), such as by exchanging timestamp and/or other metadata information with the counterpart operating system level process on the electronic device 104. Example process flows for managing a group session that utilizes DRM content is discussed further below with respect to FIGS. 4-6.

In one or more implementations, a user in the group session may request, e.g., from within another application process, to add content from the other application process to the group session. The request may be passed from the other application process to the operating system level process. The operating system level process may subsequently receive other application content from the other application and may coordinate displaying the other application content within the host environment of the group session.

In one or more implementations, the user who initiated the group session may be provided with permission controls to discretely control viewing, modifying, removing, interacting, and/or other rights/permissions with respect to the other users in the group session and with respect to any content (or portion thereof) being displayed (or presented) in the group session. For example, the user may place a viewing restriction on one user with respect to a particular portion of a particular piece of content, such as a document (or portion thereof), but not on other users in the group session.

In one or more implementations, the user that initiated the group session may be able to record the group session for subsequent viewing and/or interaction. The user also may be able to provide recording rights to one or more other users in the group session (e.g., subject to any other viewing/interaction restrictions placed on the other users). The electronic device 105 may store the recording of the group session, such as locally and/or securely at the server 120, and the user and/or another user, may replay the recording at a later time. The recording may include depth information, mesh information, other geometries, and the like, such that the replay of the recording can be experienced in the same host environment as the original group session. During the replay of the recording, the user may be able to annotate a portion of the recording, such as a particular, time, location, and/or content within the recording. The annotation may be, for example, an audio recording, a note, a video recording, and/or the like. The annotation maybe stored in conjunction with the recording, and the annotation may be presented during a subsequent replay of the recording.

Although the process 300 has been primarily described with respect to two users within a group session, the group session may include any number of users. For example, during the group session one of the users (if authorized), such as the user of the electronic device 105, may request (e.g., via an application process) to add an additional user to the group session. The application process may pass the request to an operating system level process which may coordinate with a counterpart operating system level process on an additional electronic device of the additional user. The operating system level process of the electronic device 105 may also coordinate with a counterpart operating system level process on the electronic device 104 to add the additional user to the group.

In one or more implementations, the operating system level processes on each of the respective electronic devices 104, 105 may manage the group session in an ad hoc fashion such that when a user requests to leave the group session, the electronic devices of the remaining users can continue to participate in the group session. However, in one or more implementations, the operating system level process of the electronic device 105 of the user who initiated the group session may handle the primary management functions for managing the group session (e.g., synchronizing content, user interactions, adding/removing users, conflict resolution, and the like). In this instance, when a request is received from the user of the electronic device 105 to leave the group session, the operating system level process of the electronic device 105 may (e.g., with permission of the user), handoff the primary management functions to an electronic device of a user still in the group session. In one or more implementations, the user of the electronic device 105 may designate a particular user staying in the group session to assume the primary management functions. In one or more implementations, the electronic device assuming the primary management functions may be automatically determined by the operating system level process based on one or more of processing resources, power constraints, bandwidth constraints, and the like.

Figure 4:
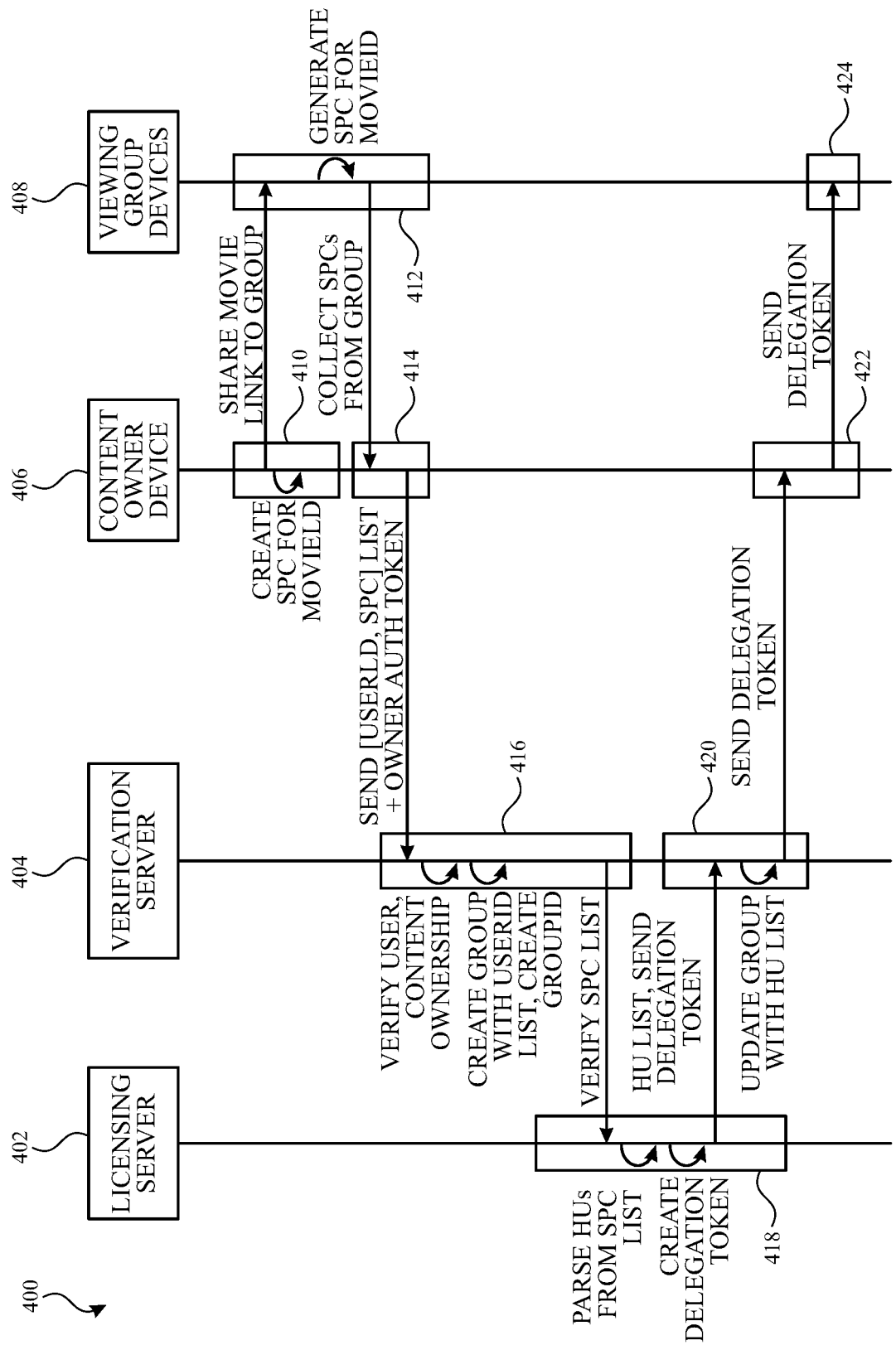
FIG. 4 illustrates an example process flow of providing a delegation token to a group for shared access to content protected by a digital rights management (DRM) system, in accordance with one or more implementations.

FIG. 4 illustrates an example process flow 400 of providing a delegation token to a group for shared access to content protected by a digital rights management (DRM) system, in accordance with one or more implementations. For explanatory purposes, the process flow 400 is primarily described herein with reference to the electronic device 105 of FIGS. 1 and 2. However, the process flow 400 is not limited to the electronic device 105 of FIGS. 1 and 2, and one or more blocks (or operations) of the process flow 400 may be performed by one or more other components of other suitable devices, including the electronic device 110, the electronic device 115, and/or the servers 120. Further for explanatory purposes, some of the blocks of the process flow 400 are described herein as occurring in serial, or linearly. However, multiple blocks of the process flow 400 may occur in parallel. In addition, the blocks of the process flow 400 need not be performed in the order shown and/or one or more blocks of the process flow 400 need not be performed and/or can be replaced by other operations.

The process flow 400 includes a licensing server 402, a verification server 404, a content owner device 406, and viewing group devices 408. The licensing server 402 and/or the verification server 404 may be and/or may include all or part of the server 120. In one or more implementations, the licensing server 402 and the verification server 404 may be the same server and/or may be different processes on the same server. The content owner device 406 may be an electronic device, such as the electronic device 105, of a user in a group session who owns DRM protected content, e.g. a movie, that they would like to share/view with other users in the group session. The viewing group devices 408 may be the electronic devices of the other users in the group session, such as the electronic devices 104, 110, and/or 115. Although the viewing group devices 408 are discussed collectively, it is understood that the described operations are performed by one or more, or each, of the devices in the viewing group.

The process flow 400 begins when the user of the content owner device 406 requests to share the DRM content with the viewing group devices 408. In one or more implementations, the content owner device 406 and one or more of the viewing group devices 408 may already be in a group session, or the group session may be initiated in conjunction with the request by the content owner device 406 to share the DRM content. When the request to share the content is received, the content owner device 406 provides a network identifier (e.g., a movie link) and content identifier (e.g., movie identifier or MovieID) to the viewing group devices 408 for retrieving the content, and the content owner device 406 generates a secure playback context (SPC) for the content based on the content identifier, such as based on a movie identifier (410). The SPC may include, for example, a hardware unique identifier (HU) of the content owner device 406. In one or more implementations, the SPC may be an encrypted key request. One or more of the devices in the viewing group devices 408 receives the network identifier for retrieving (and/or streaming) the content and generates a SPC for the content based on the content identifier, such as a movie identifier (412). Each SPC may include, for example, a hardware unique identifier of each respective device of the viewing group devices 408.

One or more of the devices of the viewing group devices 408 provides the generated SPCs to the content owner device 406, and the content owner device 406 provides the SPCs and corresponding user identifiers, as well as an authorization token for accessing the content to the verification server 404 (414). The verification server 404 verifies that the user of the content owner device 406 owns the content, e.g., based on the authorization token, creates a viewing group that includes the user identifiers of the users and a generated group identifier (GroupId), and provides a list of the SPCs to the licensing server 402 for further verification (416). The licensing server 402 parses the hardware unique identifiers from the list of SPCs, creates a delegation token, and provides a list of the hardware unique identifiers and the delegation token to the verification server 404 (418). The verification server 404 updates the group list with the list of the hardware unique identifiers and sends the delegation token to the content owner device 406 (420). The content owner device 406 provides the delegation token to the devices of the viewing group devices 408 (422). The viewing group devices 408 receive the delegation token (424), which can be subsequently used to access a content key, as is discussed further below with respect to FIG. 5.

In one or more implementations, the delegation token may include one or more data fields, such as version, nonce, content identifier (e.g., movie identifier), group identifier, owner device hardware unique identifier, the list of hardware unique identifiers of the viewing group devices, and a creation date. The nonce may be, for example, a random 64 bit number than may be changed each time the token is updated. The hardware unique identifier list may be modified when the token expires and re-created. The validity window for the delegation token may be the time after which lease requests will not be honored. In one or more implementations, the validity window may be a fixed value for a given asset type, such as a large value to allow playback of video content to complete. The delegation token may be, for example, encrypted and/or processed using a hash-based message authentication code (HMAC).

Figure 5:
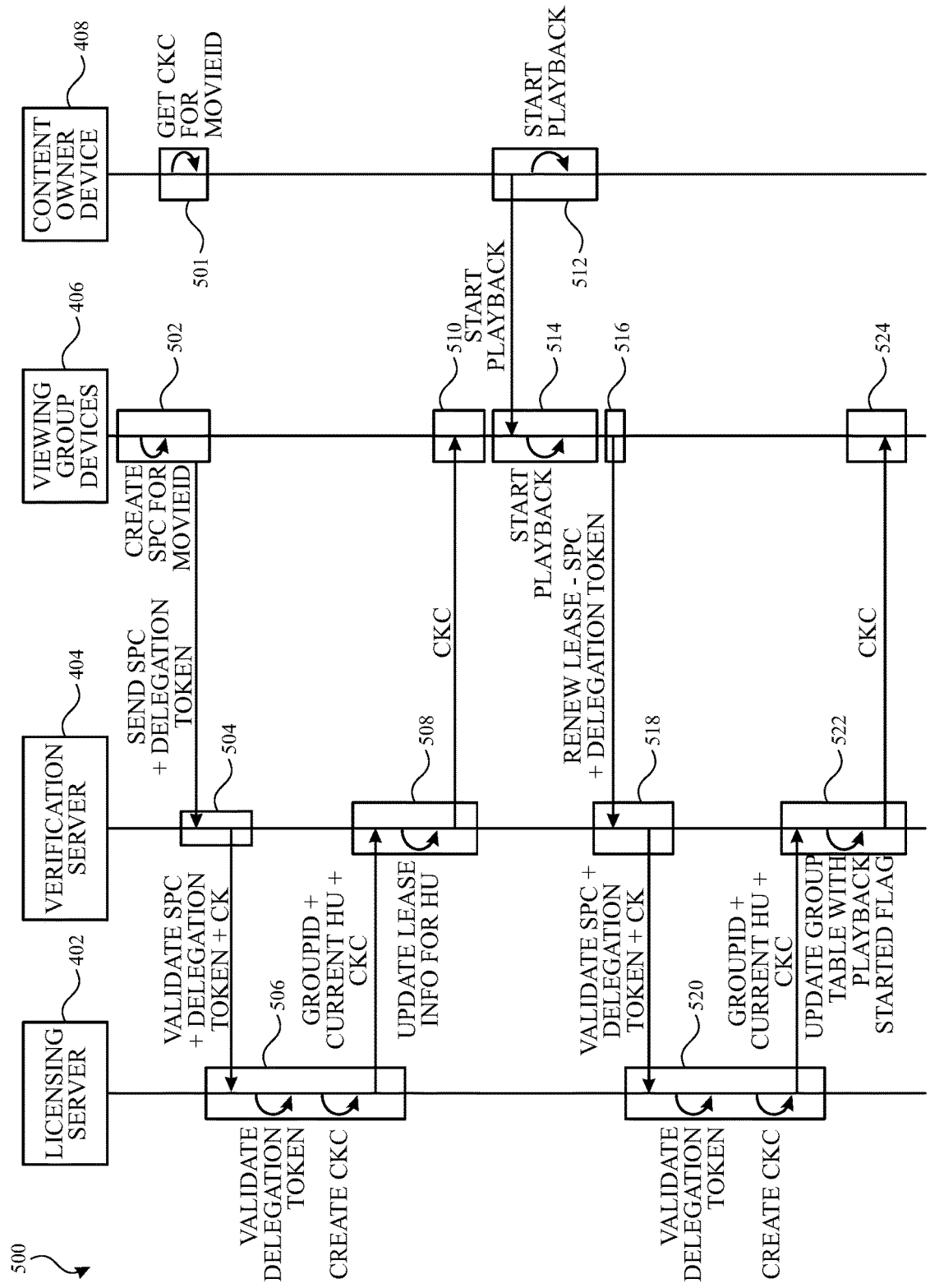
FIG. 5 illustrates an example process flow of shared group access to content protected by a DRM system, in accordance with one or more implementations.

FIG. 5 illustrates an example process flow 500 of group access to content protected by a DRM system, in accordance with one or more implementations. For explanatory purposes, the process flow 500 is primarily described herein with reference to the electronic device 105 of FIGS. 1 and 2. However, the process flow 500 is not limited to the electronic device 105 of FIGS. 1 and 2, and one or more blocks (or operations) of the process flow 500 may be performed by one or more other components of other suitable devices, including the electronic device 110, the electronic device 115, and/or the servers 120. Further for explanatory purposes, some of the blocks of the process flow 500 are described herein as occurring in serial, or linearly. However, multiple blocks of the process flow 500 may occur in parallel. In addition, the blocks of the process flow 500 need not be performed in the order shown and/or one or more blocks of the process flow 500 need not be performed and/or can be replaced by other operations.

Once the viewing group devices 408 have obtained a delegation token (as described above with respect to FIG. 4), one or more of the viewing group devices 408 can generate a SPC for the content identifier (e.g., movie identifier) and provide the SPC and delegation token to the verification server 404 (502). The verification server 404 receives the SPC and delegation token and transmits the SPC and delegation token, and content key, to the licensing server 402 for validation (504). The licensing server 402 validates the delegation token, generates a content key context (CKC), which may be an encrypted key response, and provides the group identifier, the list of hardware unique identifiers, and the CKC to the verification server 404 (506). The verification server updates the lease information (e.g., expiration times) for the list of hardware unique identifiers, and provides the CKC to the viewing group devices 408 (508). The viewing group devices 408 receive the CKC and wait for the playback to be initiated by the content owner device 406 (510).

The content owner device 406 obtains the CKC for the content identifier (501), transmits an indication of a playback start time to the viewing group devices 408, and starts playback at the playback start time (512). The viewing group devices 408 receive the indication and start playback (e.g., by accessing the content from the content server via the received network identifier and decrypting the content using the content key corresponding to the CKC) at the indicated time (514). In one or more implementations, the playback may be controlled by the operating system level processes on the viewing group devices 408. In this manner, during playback the operating system level processes on the viewing group devices 408 may prevent copying, recording, and/or redistributing the DRM protected content being viewed.

In one or more implementations, if a recording is made of a group communication session during which DRM protected content is being viewed, the DRM protected content may be obfuscated from the recording when a user viewing the recording does not have rights to the DRM protected content.

If the lease for the CKC (e.g., the expiration time) expires before the playback is completed, the viewing group devices 408 transmit a request to renew the lease to the verification server 404 (516). The request may include the SPC and the delegation token. The verification server 404 receives the request, and passes the SPC, delegation token, and content key to the licensing server 402 for validation (518). The licensing server 402 validates the delegation token, generates a content key context, which may be an encrypted key response, and provides the group identifier, the list of hardware unique identifiers, and the CKC to the verification server 404 (520). The verification server 404 updates the group table with a playback started flag and provides the CKC to the viewing group devices 408 (522). The viewing group devices 408 receive the CKC and continue to access the content (524).

Figure 6:
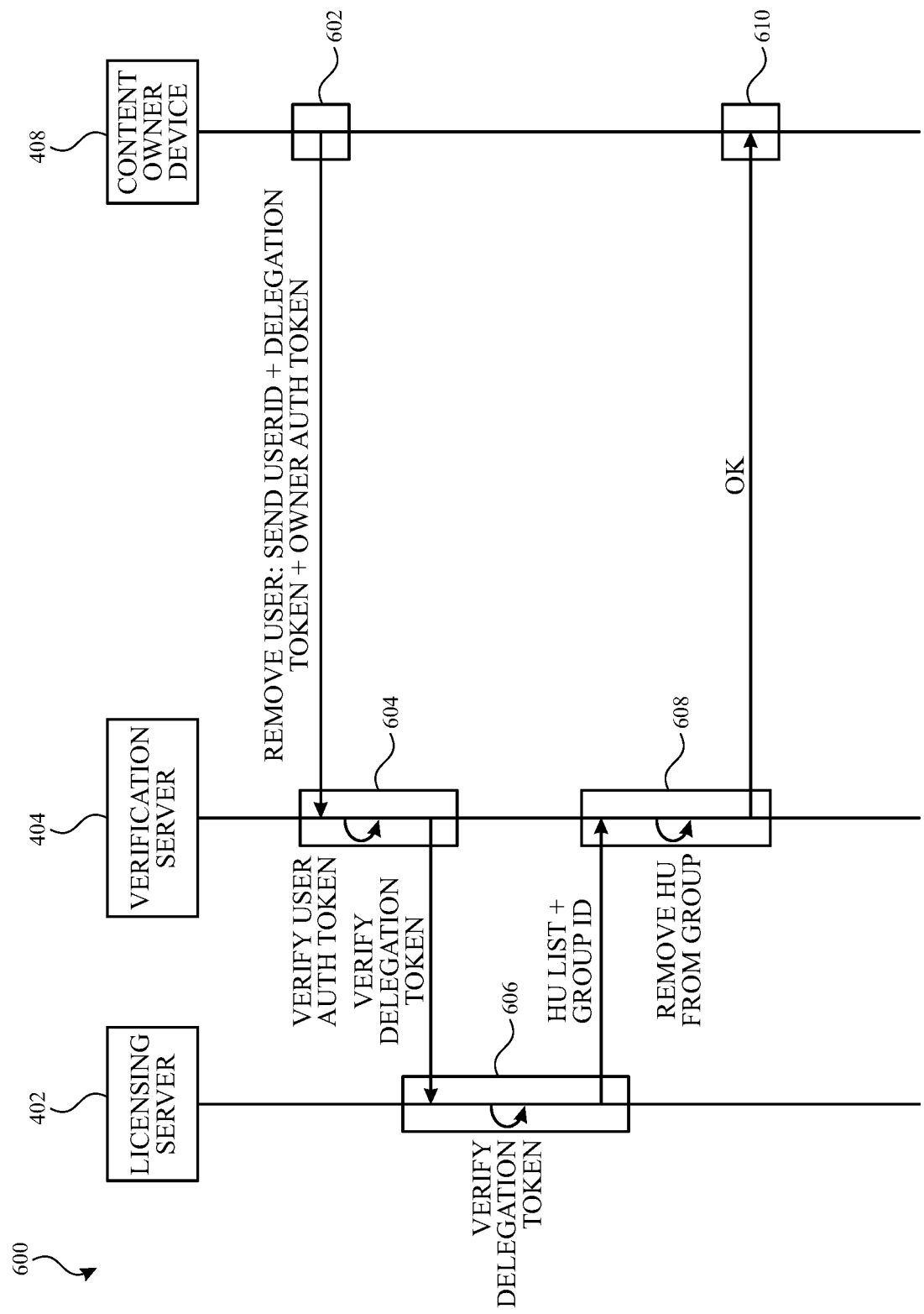
FIG. 6 illustrates an example process flow of removing a user from a group that has been provided shared access to content protected by a DRM system, in accordance with one or more implementations.

FIG. 6 illustrates an example process flow 600 of removing a user from a group that has been provided access to content protected by a DRM system, in accordance with one or more implementations. For explanatory purposes, the process flow 600 is primarily described herein with reference to the electronic device 105 of FIGS. 1 and 2. However, the process flow 600 is not limited to the electronic device 105 of FIGS. 1 and 2, and one or more blocks (or operations) of the process flow 600 may be performed by one or more other components of other suitable devices, including the electronic device 110, the electronic device 115, and/or the servers 120. Further for explanatory purposes, some of the blocks of the process flow 600 are described herein as occurring in serial, or linearly. However, multiple blocks of the process flow 600 may occur in parallel. In addition, the blocks of the process flow 600 need not be performed in the order shown and/or one or more blocks of the process flow 600 need not be performed and/or can be replaced by other operations.

The process flow 600 begins when the user of the content owner device 406 requests to remove another user from the shared viewing. For example, the request may be automatically generated when another user leaves the group session, or the request may be generated when the user of the content owner device 406 would like to manually remove another user for any other reason. The content owner device 406 transmits a remove user request to the verification server 404 that includes the user identifier (UserId) of the user being removed, the delegation token, and the authorization token of the user of the content owner device 406 (602).

The verification server 404 receives the request, verifies the user of the content owner device 406 based at least in part on the authorization token, and transmits the delegation token to the licensing server 402 for verification (604). The licensing server 402 receives the delegation token, verifies the delegation token, and then transmits the hardware unique identifier list and the group identifier to the verification server 404 (606). The verification server 404 removes the hardware unique identifier corresponding to the electronic device of the user being removed from the list of hardware unique identifiers for the group, and transmits a confirmation message to the content owner device 406 (608). The content owner device 406 receives the confirmation message confirming that the other user has been removed (610).

In one or more implementations, the content owner device 406 can leave the group session, and/or stop viewing the content, and the other viewing group devices 408 may continue to view the content. In one or more implementations, additional user devices can be added to the viewing group devices 408 at any time, e.g., during playback, using the process flows described above.

The present disclosure recognizes that the use of such personal information data, in the present technology, can be used to the benefit of users. For example, the personal information data can be used for operating system level group session management.

The present disclosure contemplates that those entities responsible for the collection, analysis, disclosure, transfer, storage, or other use of such personal information data will comply with well-established privacy policies and/or privacy practices. In particular, such entities would be expected to implement and consistently apply privacy practices that are generally recognized as meeting or exceeding industry or governmental requirements for maintaining the privacy of users. Such information regarding the use of personal data should be prominently and easily accessible by users, and should be updated as the collection and/or use of data changes. Personal information from users should be collected for legitimate uses only. Further, such collection/sharing should occur only after receiving the consent of the users or other legitimate basis specified in applicable law. Additionally, such entities should consider taking any needed steps for safeguarding and securing access to such personal information data and ensuring that others with access to the personal information data adhere to their privacy policies and procedures. Further, such entities can subject themselves to evaluation by third parties to certify their adherence to widely accepted privacy policies and practices. In addition, policies and practices should be adapted for the particular types of personal information data being collected and/or accessed and adapted to applicable laws and standards, including jurisdiction-specific considerations which may serve to impose a higher standard. For instance, in the US, collection of or access to certain health data may be governed by federal and/or state laws, such as the Health Insurance Portability and Accountability Act (HIPAA); whereas health data in other countries may be subject to other regulations and policies and should be handled accordingly.

Despite the foregoing, the present disclosure also contemplates embodiments in which users selectively block the use of, or access to, personal information data. That is, the present disclosure contemplates that hardware and/or software elements can be provided to prevent or block access to such personal information data. For example, in the operating system level group session management, the present technology can be configured to allow users to select to "opt in" or "opt out" of participation in the collection and/or sharing of personal information data during registration for services or anytime thereafter. In addition to providing "opt in" and "opt out" options, the present disclosure contemplates providing notifications relating to the access or use of personal information. For instance, a user may be notified upon downloading an app that their personal information data will be accessed and then reminded again just before personal information data is accessed by the app.

Moreover, it is the intent of the present disclosure that personal information data should be managed and handled in a way to minimize risks of unintentional or unauthorized access or use. Risk can be minimized by limiting the collection of data and deleting data once it is no longer needed. In addition, and when applicable, including in certain health related applications, data de-identification can be used to protect a user's privacy. De-identification may be facilitated, when appropriate, by removing identifiers, controlling the amount or specificity of data stored (e.g., collecting location data at city level rather than at an address level or at a scale that is insufficient for facial recognition), controlling how data is stored (e.g., aggregating data across users), and/or other methods such as differential privacy.

Therefore, although the present disclosure broadly covers use of personal information data to implement one or more various disclosed embodiments, the present disclosure also contemplates that the various embodiments can also be implemented without the need for accessing such personal information data. That is, the various embodiments of the present technology are not rendered inoperable due to the lack of all or a portion of such personal information data.

Figure 7:
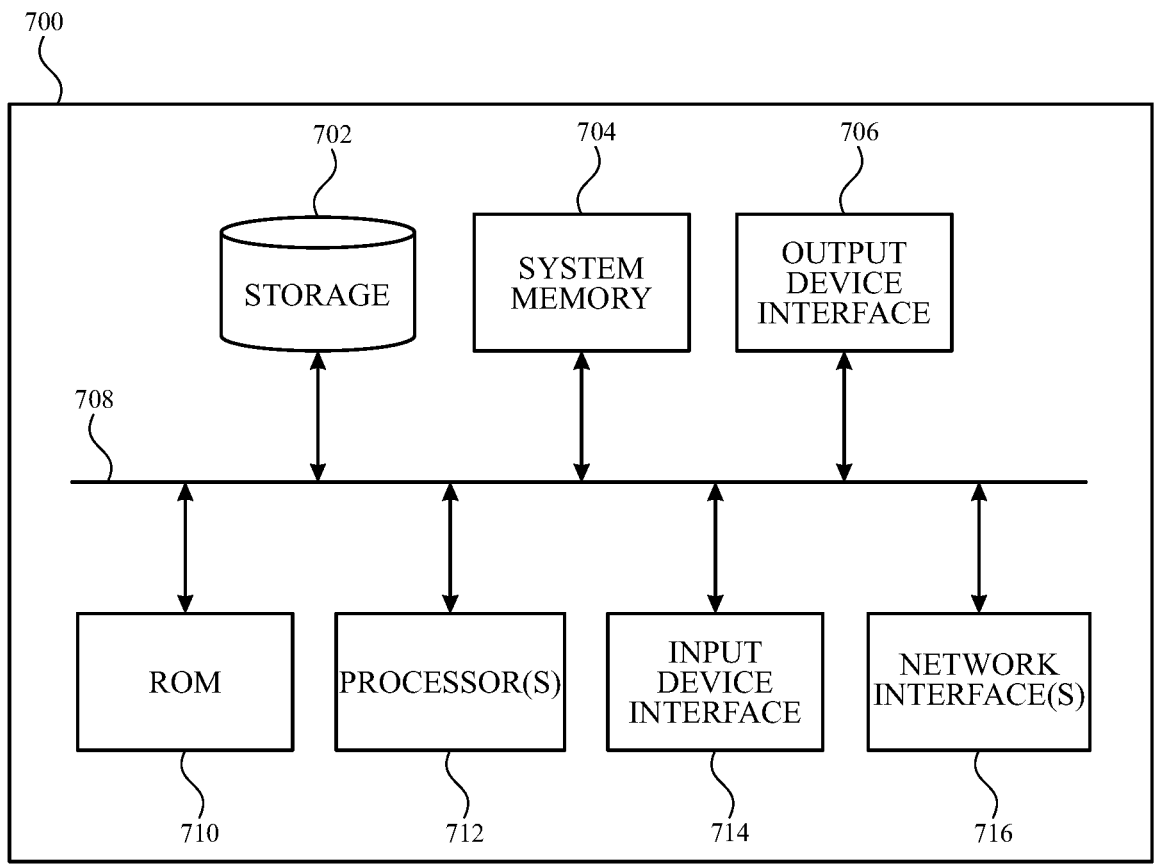
FIG. 7 illustrates an electronic system with which one or more implementations of the subject technology may be implemented.

FIG. 7 illustrates an electronic system 700 with which one or more implementations of the subject technology may be implemented. The electronic system 700 can be, and/or can be a part of, the electronic device 105, the handheld electronic device 104, the electronic device 110, the electronic device 115, and/or the server 120 as shown in FIG. 1. The electronic system 700 may include various types of computer readable media and interfaces for various other types of computer readable media. The electronic system 700 includes a bus 708, one or more processing unit(s) 712, a system memory 704 (and/or buffer), a ROM 710, a permanent storage device 702, an input device interface 714, an output device interface 706, and one or more network interfaces 716, or subsets and variations thereof.

The bus 708 collectively represents all system, peripheral, and chipset buses that communicatively connect the numerous internal devices of the electronic system 700. In one or more implementations, the bus 708 communicatively connects the one or more processing unit(s) 712 with the ROM 710, the system memory 704, and the permanent storage device 702. From these various memory units, the one or more processing unit(s) 712 retrieves instructions to execute and data to process in order to execute the processes of the subject disclosure. The one or more processing unit(s) 712 can be a single processor or a multi-core processor in different implementations.

The ROM 710 stores static data and instructions that are needed by the one or more processing unit(s) 712 and other modules of the electronic system 700. The permanent storage device 702, on the other hand, may be a read-and-write memory device. The permanent storage device 702 may be a non-volatile memory unit that stores instructions and data even when the electronic system 700 is off. In one or more implementations, a mass-storage device (such as a magnetic or optical disk and its corresponding disk drive) may be used as the permanent storage device 702.

In one or more implementations, a removable storage device (such as a floppy disk, flash drive, and its corresponding disk drive) may be used as the permanent storage device 702. Like the permanent storage device 702, the system memory 704 may be a read-and-write memory device. However, unlike the permanent storage device 702, the system memory 704 may be a volatile read-and-write memory, such as random access memory. The system memory 704 may store any of the instructions and data that one or more processing unit(s) 712 may need at runtime. In one or more implementations, the processes of the subject disclosure are stored in the system memory 704, the permanent storage device 702, and/or the ROM 710 (which are each implemented as a non-transitory computer-readable medium). From these various memory units, the one or more processing unit(s) 712 retrieves instructions to execute and data to process in order to execute the processes of one or more implementations.

The bus 708 also connects to the input and output device interfaces 714 and 706. The input device interface 714 enables a user to communicate information and select commands to the electronic system 700. Input devices that may be used with the input device interface 714 may include, for example, alphanumeric keyboards and pointing devices (also called "cursor control devices"). The output device interface 706 may enable, for example, the display of images generated by electronic system 700. Output devices that may be used with the output device interface 706 may include, for example, printers and display devices, such as a liquid crystal display (LCD), a light emitting diode (LED) display, an organic light emitting diode (OLED) display, a flexible display, a flat panel display, a solid state display, a projector, or any other device for outputting information. One or more implementations may include devices that function as both input and output devices, such as a touchscreen. In these implementations, feedback provided to the user can be any form of sensory feedback, such as visual feedback, auditory feedback, or tactile feedback; and input from the user can be received in any form, including acoustic, speech, or tactile input.

Finally, as shown in FIG. 7, the bus 708 also couples the electronic system 700 to one or more networks and/or to one or more network nodes, such as the electronic device 110 shown in FIG. 1, through the one or more network interface(s) 716. In this manner, the electronic system 700 can be a part of a network of computers (such as a LAN, a wide area network ("WAN"), or an Intranet, or a network of networks, such as the Internet. Any or all components of the electronic system 700 can be used in conjunction with the subject disclosure.

These functions described above can be implemented in computer software, firmware or hardware. The techniques can be implemented using one or more computer program products. Programmable processors and computers can be included in or packaged as mobile devices. The processes and logic flows can be performed by one or more programmable processors and by one or more programmable logic circuitry. General and special purpose computing devices and storage devices can be interconnected through communication networks.

Some implementations include electronic components, such as microprocessors, storage and memory that store computer program instructions in a machine-readable or computer-readable medium (also referred to as computer-readable storage media, machine-readable media, or machine-readable storage media). Some examples of such computer-readable media include RAM, ROM, read-only compact discs (CD-ROM), recordable compact discs (CD-R), rewritable compact discs (CD-RW), read-only digital versatile discs (e.g., DVD-ROM, dual-layer DVD-ROM), a variety of recordable/rewritable DVDs (e.g., DVD-RAM, DVD-RW, DVD+RW, etc.), flash memory (e.g., SD cards, mini-SD cards, micro-SD cards, etc.), magnetic and/or solid state hard drives, read-only and recordable Blu-Ray® discs, ultra density optical discs, any other optical or magnetic media, and floppy disks. The computer-readable media can store a computer program that is executable by at least one processing unit and includes sets of instructions for performing various operations. Examples of computer programs or computer code include machine code, such as is produced by a compiler, and files including higher-level code that are executed by a computer, an electronic component, or a microprocessor using an interpreter.

While the above discussion primarily refers to microprocessor or multi-core processors that execute software, some implementations are performed by one or more integrated circuits, such as application specific integrated circuits (ASICs) or field programmable gate arrays (FPGAs). In some implementations, such integrated circuits execute instructions that are stored on the circuit itself.

As used in this specification and any claims of this application, the terms "computer", "server", "processor", and "memory" all refer to electronic or other technological devices. These terms exclude people or groups of people. For the purposes of the specification, the terms display or displaying means displaying on an electronic device. As used in this specification and any claims of this application, the terms "computer readable medium" and "computer readable media" are entirely restricted to tangible, physical objects that store information in a form that is readable by a computer. These terms exclude any wireless signals, wired download signals, and any other ephemeral signals.

To provide for interaction with a user, implementations of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; e.g., feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; e.g., by sending web pages to a web browser on a user's client device in response to requests received from the web browser.

Embodiments of the subject matter described in this specification can be implemented in a computing system that includes a back end component, e.g., as a data server, or that includes a middleware component, e.g., an application server, or that includes a front end component, e.g., a client computer having a graphical user interface or a Web browser through which a user can interact with an implementation of the subject matter described in this specification, or any combination of one or more such back end, middleware, or front end components. The components of the system can be interconnected by any form or medium of digital data communication, e.g., a communication network. Examples of communication networks include a local area network ("LAN") and a wide area network ("WAN"), an inter-network (e.g., the Internet), and peer-to-peer networks (e.g., ad hoc peer-to-peer networks).

The computing system can include clients and servers. A client and server are generally remote from each other and may interact through a communication network. The relationship of client and server arises by virtue of computer programs running on the respective computers and having a client-server relationship to each other. In some embodiments, a server transmits data (e.g., an HTML, page) to a client device (e.g., for purposes of displaying data to and receiving user input from a user interacting with the client device). Data generated at the client device (e.g., a result of the user interaction) can be received from the client device at the server.

In accordance with aspects of the disclosure, a method is provided that includes receiving, by an operating system level process executing on a device and from an application process executing on a device, a request to initiate a group session between a user associated with the device and another user; identifying, by the operating system level process, another device associated with the other user; initiating, by the operating system level process, the group session between the user and the other user via the other device; receiving, by the operating system level process and from the application process, application content; and managing, by the operating system level process, the group session based at least in part on the received application content.

In accordance with aspects of the disclosure, a device is provided that includes a memory; and at least one processor configured to: receive, by an operating system level process executing on a device and from an application process executing on a device, a request to initiate a group session between a user associated with the device and another user; identify, by the operating system level process, another device associated with the other user; initiate, by the operating system level process, the group session with the user via the other device; and manage, by the operating system level process, the group session.

In accordance with aspects of the disclosure, a non-transitory computer-readable medium is provided storing instructions which, when executed by one or more processors, cause the one or more processors to perform operations that include: receiving, by an operating system level process executing on a device and from an application process executing on a device, a request to initiate a group session between a user associated with the device and another user; identifying, by the operating system level process, another device associated with the other user; initiating, by the operating system level process, the group session between the user and the other user via the other device; and managing, by the operating system level process, the group session.

Implementations within the scope of the present disclosure can be partially or entirely realized using a tangible computer-readable storage medium (or multiple tangible computer-readable storage media of one or more types) encoding one or more instructions. The tangible computer-readable storage medium also can be non-transitory in nature.

The computer-readable storage medium can be any storage medium that can be read, written, or otherwise accessed by a general purpose or special purpose computing device, including any processing electronics and/or processing circuitry capable of executing instructions. For example, without limitation, the computer-readable medium can include any volatile semiconductor memory, such as RAM, DRAM, SRAM, T-RAM, Z-RAM, and TTRAM. The computer-readable medium also can include any non-volatile semiconductor memory, such as ROM, PROM, EPROM, EEPROM, NVRAM, flash, nvSRAM, FeRAM, FeTRAM, MRAM, PRAM, CBRAM, SONOS, RRAM, NRAM, racetrack memory, FJG, and Millipede memory.

Further, the computer-readable storage medium can include any non-semiconductor memory, such as optical disk storage, magnetic disk storage, magnetic tape, other magnetic storage devices, or any other medium capable of storing one or more instructions. In one or more implementations, the tangible computer-readable storage medium can be directly coupled to a computing device, while in other implementations, the tangible computer-readable storage medium can be indirectly coupled to a computing device, e.g., via one or more wired connections, one or more wireless connections, or any combination thereof.

Instructions can be directly executable or can be used to develop executable instructions. For example, instructions can be realized as executable or non-executable machine code or as instructions in a high-level language that can be compiled to produce executable or non-executable machine code. Further, instructions also can be realized as or can include data. Computer-executable instructions also can be organized in any format, including routines, subroutines, programs, data structures, objects, modules, applications, applets, functions, etc. As recognized by those of skill in the art, details including, but not limited to, the number, structure, sequence, and organization of instructions can vary significantly without varying the underlying logic, function, processing, and output.

While the above discussion primarily refers to microprocessor or multi-core processors that execute software, one or more implementations are performed by one or more integrated circuits, such as ASICs or FPGAs. In one or more implementations, such integrated circuits execute instructions that are stored on the circuit itself.

Those of skill in the art would appreciate that the various illustrative blocks, modules, elements, components, methods, and algorithms described herein may be implemented as electronic hardware, computer software, or combinations of both. To illustrate this interchangeability of hardware and software, various illustrative blocks, modules, elements, components, methods, and algorithms have been described above generally in terms of their functionality. Whether such functionality is implemented as hardware or software depends upon the particular application and design constraints imposed on the overall system. Skilled artisans may implement the described functionality in varying ways for each particular application. Various components and blocks may be arranged differently (e.g., arranged in a different order, or partitioned in a different way) all without departing from the scope of the subject technology.

It is understood that any specific order or hierarchy of blocks in the processes disclosed is an illustration of example approaches. Based upon design preferences, it is understood that the specific order or hierarchy of blocks in the processes may be rearranged, or that all illustrated blocks be performed. Any of the blocks may be performed simultaneously. In one or more implementations, multitasking and parallel processing may be advantageous. Moreover, the separation of various system components in the implementations described above should not be understood as requiring such separation in all implementations, and it should be understood that the described program components and systems can generally be integrated together in a single software product or packaged into multiple software products.

As used in this specification and any claims of this application, the terms "base station", "receiver", "computer", "server", "processor", and "memory" all refer to electronic or other technological devices. These terms exclude people or groups of people. For the purposes of the specification, the terms "display" or "displaying" means displaying on an electronic device.

As used herein, the phrase "at least one of" preceding a series of items, with the term "and" or "or" to separate any of the items, modifies the list as a whole, rather than each member of the list (i.e., each item). The phrase "at least one of" does not require selection of at least one of each item listed; rather, the phrase allows a meaning that includes at least one of any one of the items, and/or at least one of any combination of the items, and/or at least one of each of the items. By way of example, the phrases "at least one of A, B, and C" or "at least one of A, B, or C" each refer to only A, only B, or only C; any combination of A, B, and C; and/or at least one of each of A, B, and C.

The predicate words "configured to", "operable to", and "programmed to" do not imply any particular tangible or intangible modification of a subject, but, rather, are intended to be used interchangeably. In one or more implementations, a processor configured to monitor and control an operation or a component may also mean the processor being programmed to monitor and control the operation or the processor being operable to monitor and control the operation. Likewise, a processor configured to execute code can be construed as a processor programmed to execute code or operable to execute code.

Phrases such as an aspect, the aspect, another aspect, some aspects, one or more aspects, an implementation, the implementation, another implementation, some implementations, one or more implementations, an embodiment, the embodiment, another embodiment, some implementations, one or more implementations, a configuration, the configuration, another configuration, some configurations, one or more configurations, the subject technology, the disclosure, the present disclosure, other variations thereof and alike are for convenience and do not imply that a disclosure relating to such phrase(s) is essential to the subject technology or that such disclosure applies to all configurations of the subject technology. A disclosure relating to such phrase(s) may apply to all configurations, or one or more configurations. A disclosure relating to such phrase(s) may provide one or more examples. A phrase such as an aspect or some aspects may refer to one or more aspects and vice versa, and this applies similarly to other foregoing phrases.

The word "exemplary" is used herein to mean "serving as an example, instance, or illustration". Any embodiment described herein as "exemplary" or as an "example" is not necessarily to be construed as preferred or advantageous over other implementations. Furthermore, to the extent that the term "include", "have", or the like is used in the description or the claims, such term is intended to be inclusive in a manner similar to the term "comprise" as "comprise" is interpreted when employed as a transitional word in a claim.

All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. § 112(f) unless the element is expressly recited using the phrase "means for" or, in the case of a method claim, the element is recited using the phrase "step for".

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but are to be accorded the full scope consistent with the language claims, wherein reference to an element in the singular is not intended to mean "one and only one" unless specifically so stated, but rather "one or more". Unless specifically stated otherwise, the term "some" refers to one or more. Pronouns in the masculine (e.g., his) include the feminine and neuter gender (e.g., her and its) and vice versa. Headings and subheadings, if any, are used for convenience only and do not limit the subject disclosure.

What is claimed is:

1. A method, comprising:
  receiving, by an operating system level process executing on a device and from an application process executing on a device, a request to initiate a group session between a user associated with the device and another user;
  identifying, by the operating system level process, another device associated with the other user;
  initiating, by the operating system level process, the group session between the user and the other user via the other device, wherein initiating the group session between the user and the other user via the other device comprises, by the operating system level process:
    determining a host environment in which to display the group session at the device and the other device; and
    initiating the group session within the host environment by displaying the host environment at the device;
  receiving, by the operating system level process and from the application process, application content; and
  managing, by the operating system level process, the group session at least in part by displaying the received application content within the host environment.

2. The method of claim 1, wherein the host environment comprises at least one of a physical environment of the user, another physical environment of the other user, a virtual environment, or a hybrid environment comprising the physical environment of the user and the other physical environment of the other user.

3. The method of claim 2, wherein the host environment comprises the physical environment of the user, and initiating the group session within the host environment comprises:
  receiving a video stream of the physical environment of the user; and
  providing, to the other device, information for generating a reconstruction of the physical environment of the user, the information being generated based at least in part on the video stream.

4. The method of claim 3, wherein managing, by the operating system level process, the group session based at least in part on the received application content further comprises:
  displaying, by the application process, at least a portion of the video stream of the physical environment of the user and at least a portion of the received application content.

5. The method of claim 3, wherein the information for generating the reconstruction of the physical environment of the user includes information corresponding to a portion of the physical environment that is not included in the video stream.

6. The method of claim 3, further comprising:
  preventing the application process from accessing the video stream or the information for generating the reconstruction of the physical environment of the user.

7. The method of claim 1, further comprising:
  authenticating that an avatar of the user of the device corresponds to the user; and
  providing, to the other device, the avatar of the user for display in the group session.

8. The method of claim 7, wherein authenticating that the avatar of the user of the device corresponds to the user further comprises:
  verifying that one or more virtual attributes of the avatar conform with one or more physical attributes of the user.

9. The method of claim 1, further comprising:
  storing a recording of the group session;
  after the group session has ended, replaying the recording of the group session for the user responsive to a request therefor;
  receiving user input for an annotation to a portion of the recording of the group session during the replaying of the recording of the group session; and
  storing the annotation in association with the portion of the recording of the group session.

10. The method of claim 9, further comprising:
  after storing the annotation, replaying the recording of the group session to the user responsive to another request therefor, wherein the annotation is displayed in conjunction with displaying the portion of the recording.

11. The method of claim 1, wherein the device comprises a head mountable system and the other device comprises a handheld mobile device or a tablet device.

12. The method of claim 1, wherein an application corresponding to the application process is not installed on the other device when the request to initiate the group session is received and initiating, by the operating system level process, the group session between the user and the other user via the other device further comprises:
  causing, by the operating system level process, the other device to download and install at least a portion of the application.

13. The method of claim 12, wherein the group session is initiated prior to the other device having downloaded and installed the at least the portion of the application and managing, by the operating system level process, the group session based at least in part on the received application content comprises:
  providing, to the other device, a non-interactive version of the received application content.

14. The method of claim 13, further comprising:
after the other device has downloaded and installed the at least the portion of the application, transitioning from providing, to the other device, the non-interactive version of the received application content to providing, to the other device an interactive version of the received application content.

15. The method of claim 14, wherein the non-interactive version of the received application content comprises two-dimensional content and the interactive version of the received application content comprises three-dimensional content.

16. The method of claim 1, further comprising:
receiving, by the operating system level process and from another application process, another application content; and
managing, by the operating system level process, the group session based at least in part on the application content received from the application process and the other application content received from the other application process.

17. The method of claim 1, further comprising:
receiving, by the operating system level process executing on the device and from the application process executing on the device, another request to add an additional user to the group session; and
adding, by the operating system level process, the additional user to the group session via an additional device of the additional user.

18. The method of claim 1, wherein managing, by the operating system level process, the group session based at least in part on the received application content comprises:
receiving a request from the user to leave the group session; and
handing off, by the operating system level process, the group session to at least one of another operating system level process of the other device or an additional operating system level process of an additional device.

19. The method of claim 1, wherein the application content corresponds to content protected by digital rights management, and managing, by the operating system level process, the group session based at least in part on the received application content comprises:
providing, by the operating system level process and to the other device, a network identifier for retrieving the content from a content server; and
facilitating providing, by the operating system level process and to the other device, a key for accessing the retrieved content.

20. The method of claim 19, wherein managing, by the operating system level process, the group session based at least in part on the received application content further comprises:
synchronizing, by the operating system level process, playback of the content on the device and the other device.

21. The method of claim 1, wherein managing, by the operating system level process, the group session based at least in part on the received application content further comprises:
controlling, by the operating system level process, at least one of interaction, modification, or reproduction by the other user with respect to the group session.

22. A device comprising:
a memory; and
at least one processor configured to:
receive, by an operating system level process executing on the device and from an application process executing on the device, a request to initiate a group session between a user associated with the device and another user;
identify, by the operating system level process, another device associated with the other user;
initiate, by the operating system level process, the group session with the user via the other device at least in part by:
determining a host environment in which to display the group session at the device and the other device; and
initiating the group session within the host environment by displaying the host environment at the device; and
manage, by the operating system level process, the group session at least in part by displaying application content, received from the application process, within the host environment.

23. A non-transitory machine readable medium comprising code that, when executed by one or more processors, causes the one or more processors to perform operations comprising:
receiving, by an operating system level process executing on a device and from an application process executing on the device, a request to initiate a group session between a user associated with the device and another user;
identifying, by the operating system level process, another device associated with the other user;
initiating, by the operating system level process, the group session between the user and the other user via the other device at least in part by:
determining a host environment in which to display the group session at the device and the other device; and
initiating the group session within the host environment by displaying the host environment at the device; and
managing, by the operating system level process, the group session at least in part by displaying application content, received from the application process, within the host environment.

24. The non-transitory machine readable medium of claim 23, wherein the operations further comprise:
receiving, by the operating system level process and from another application process, other application content; and
managing, by the operating system level process, the group session based at least in part on the application content received from the application process and the other application content received from the other application process.

* * * * *